United States Patent
Tofukuji

(10) Patent No.: US 10,253,732 B2
(45) Date of Patent: Apr. 9, 2019

(54) SUPERCHARGED INTERNAL COMBUSTION ENGINE

(71) Applicant: TOYOTA JIDOSHA KABUSHIKI KAISHA, Toyota-shi, Aichi-ken (JP)

(72) Inventor: Satoko Tofukuji, Tokyo-to (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 217 days.

(21) Appl. No.: 15/300,877

(22) PCT Filed: Mar. 30, 2015

(86) PCT No.: PCT/JP2015/060683
§ 371 (c)(1),
(2) Date: Sep. 30, 2016

(87) PCT Pub. No.: WO2015/182248
PCT Pub. Date: Dec. 3, 2015

(65) Prior Publication Data
US 2017/0067419 A1 Mar. 9, 2017

(30) Foreign Application Priority Data

May 30, 2014 (JP) .................................. 2014-112836

(51) Int. Cl.
*F02B 33/44* (2006.01)
*F02M 26/68* (2016.01)
(Continued)

(52) U.S. Cl.
CPC ............ *F02M 26/68* (2016.02); *F02M 26/06* (2016.02); *F02M 26/11* (2016.02); *F02M 26/18* (2016.02);
(Continued)

(58) Field of Classification Search
CPC ........ F02M 26/68; F02M 26/06; F02M 26/11; F02M 26/18; F02M 26/70; F02M 26/74;
(Continued)

(56) References Cited

U.S. PATENT DOCUMENTS

| 1,449,876 A | * | 3/1923 | Williams | .................. F01L 3/20 123/188.8 |
| 1,868,138 A | * | 7/1932 | Fisk | ......................... F01L 3/20 123/188.2 |

(Continued)

FOREIGN PATENT DOCUMENTS

| CN | 200985843 Y | * | 12/2007 | ........... Y02T 10/121 |
| CN | 104165104 A | * | 11/2014 | ........... Y02T 10/121 |

(Continued)

*Primary Examiner* — Thai Ba Trieu
(74) *Attorney, Agent, or Firm* — Sughrue Mion, PLLC

(57) ABSTRACT

A supercharged internal combustion engine according to the present invention includes a compressor 16a that supercharges intake air; an EGR passage 22 that connects an intake passage 12 at the upstream side of the compressor 16a and an exhaust passage 14; an EGR valve 26 that is provided in the EGR passage 22 and regulates the flow rate of EGR gas that flows through the EGR passage 22 by opening and closing the EGR passage 22; and a heat insulator 30 that is provided on a surface of the EGR valve 26 that is exposed to the EGR passage 22 which is located at the upstream side in the EGR gas flow with respect to a seal portion by a seal surface 26a1 and a valve seat 28a when the EGR valve 26 is in the fully closed position.

1 Claim, 3 Drawing Sheets

(51) Int. Cl.
*F02M 26/18* (2016.01)
*F02M 26/74* (2016.01)
*F02M 26/06* (2016.01)
*F02M 26/11* (2016.01)
*F02M 26/70* (2016.01)
*F02M 35/10* (2006.01)
*F02M 26/23* (2016.01)

(52) U.S. Cl.
CPC ............ *F02M 26/70* (2016.02); *F02M 26/74* (2016.02); *F02M 35/10157* (2013.01); *F02M 35/10222* (2013.01); *F02M 26/23* (2016.02); *Y02T 10/144* (2013.01)

(58) Field of Classification Search
CPC .............. F02M 26/23; F02M 35/10157; F02M 35/10222; Y02T 10/144; F01L 3/20; F01L 3/04
USPC ............ 60/605.2; 123/568.26, 188.2, 188.3, 123/188.7, 188.8, 568.11; 251/334; 137/338, 469
See application file for complete search history.

(56) References Cited

U.S. PATENT DOCUMENTS

| | | | | | |
|---|---|---|---|---|---|
| 2,450,803 | A | * | 10/1948 | Johnson | B23P 15/002 123/188.3 |
| 2,840,427 | A | * | 6/1958 | Dolza | F02F 3/0023 92/176 |
| 4,300,492 | A | * | 11/1981 | Bart | F01L 3/04 123/188.2 |
| 4,351,292 | A | * | 9/1982 | Worthen | F01L 3/04 123/188.2 |
| 4,362,134 | A | * | 12/1982 | Worthen | F01L 3/04 123/188.3 |
| 7,263,983 | B2 | * | 9/2007 | Maeda | F02M 26/19 123/568.21 |
| 8,122,717 | B2 | * | 2/2012 | Joergl | F02M 26/06 60/605.2 |
| 9,115,657 | B2 | * | 8/2015 | Yoshioka | F02M 26/06 |
| 2007/0141419 | A1 | | 6/2007 | Lee et al. | |
| 2010/0043761 | A1 | * | 2/2010 | Joergl | F02M 26/06 123/568.12 |
| 2010/0192892 | A1 | * | 8/2010 | Huff | F01L 3/20 123/188.3 |
| 2011/0023843 | A1 | * | 2/2011 | Ewen | F02M 26/25 123/568.12 |
| 2012/0024268 | A1 | * | 2/2012 | De Almeida | F02M 26/68 123/568.11 |
| 2012/0090584 | A1 | | 4/2012 | Jung | |
| 2014/0020664 | A1 | * | 1/2014 | Yoshioka | F02M 26/06 123/559.1 |
| 2014/0123964 | A1 | * | 5/2014 | Hatano | F02M 26/54 123/568.11 |
| 2014/0158098 | A1 | * | 6/2014 | Asanuma | F02M 26/68 123/568.11 |
| 2015/0068503 | A1 | * | 3/2015 | Wu | F02M 26/06 123/568.21 |
| 2015/0122236 | A1 | * | 5/2015 | Wilkinson | F02M 26/74 123/568.11 |
| 2015/0128915 | A1 | * | 5/2015 | Nakamura | F02M 26/68 123/568.11 |
| 2015/0330335 | A1 | * | 11/2015 | Shimada | F02M 26/54 123/568.16 |
| 2017/0089279 | A1 | * | 3/2017 | Yoeda | F02M 26/47 |
| 2017/0145967 | A1 | * | 5/2017 | Penzato | F02M 26/17 |

FOREIGN PATENT DOCUMENTS

| | | | | |
|---|---|---|---|---|
| DE | 3247487 A1 | * | 6/1984 | ................ F01L 3/02 |
| DE | 100 11 916 A1 | | 9/2001 | |
| GB | 586934 A | * | 4/1947 | ................ F01L 3/14 |
| JP | 10008925 A | * | 1/1998 | ........... Y02T 10/121 |
| JP | 2012-087779 A | | 5/2012 | |
| JP | 5144049 B2 | | 2/2013 | |
| WO | WO 8303446 A1 | * | 10/1983 | ................ F01L 3/04 |

\* cited by examiner

Fig. 3
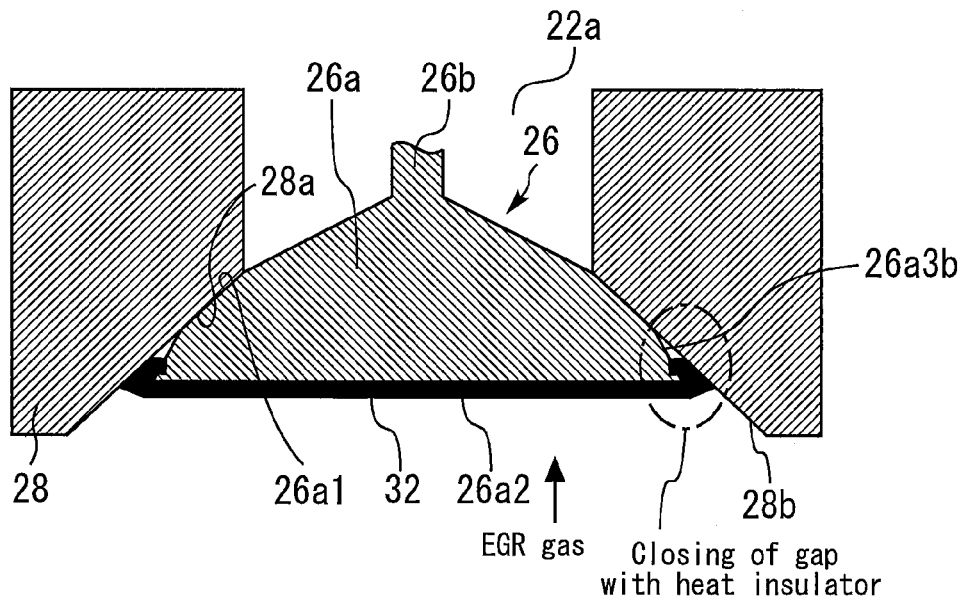
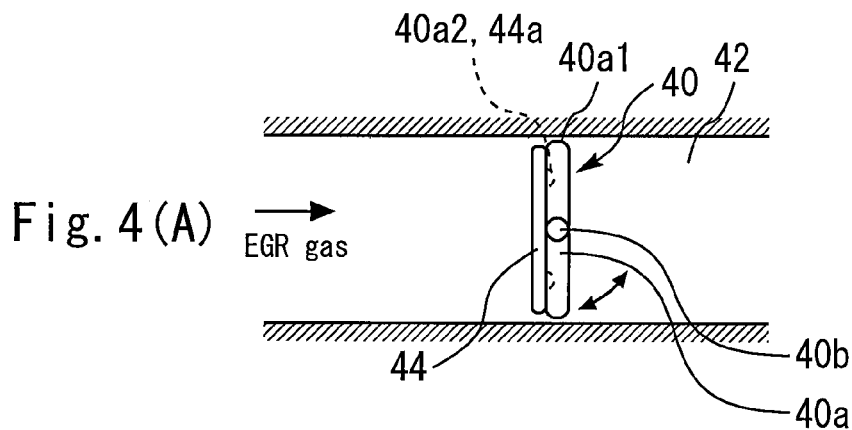
Fig. 4(A)
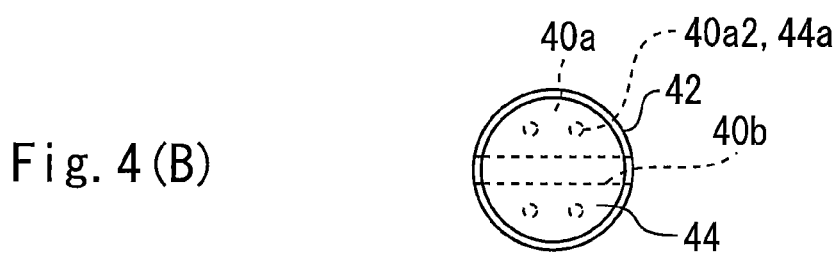
Fig. 4(B)

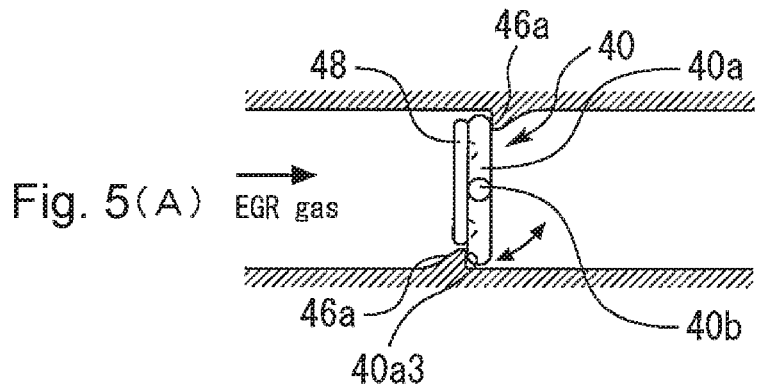
Fig. 5(A)
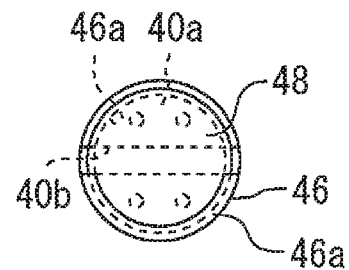
Fig. 5(B)
Fig. 6
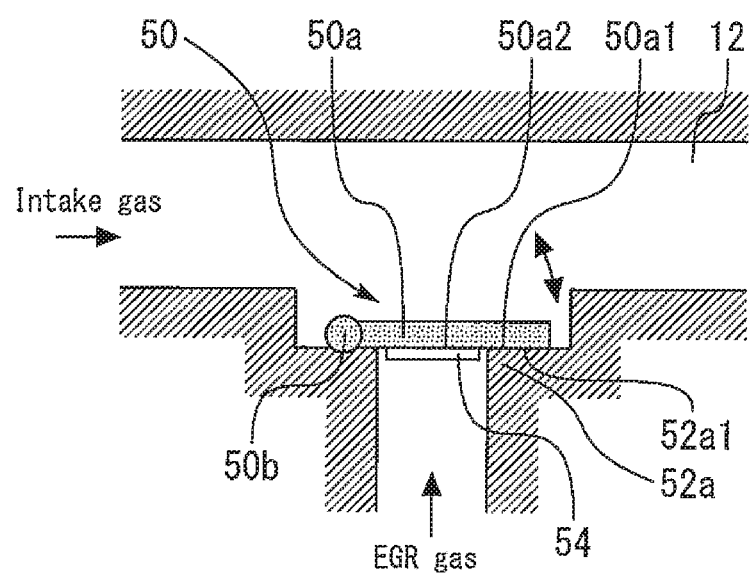

SUPERCHARGED INTERNAL COMBUSTION ENGINE

CROSS REFERENCE TO RELATED APPLICATIONS

This application is a National Stage of International Application No. PCT/JP2015/060683 filed Mar. 30, 2015, claiming priority based on Japanese Patent Application No. 2014-112836 filed May 30, 2014, the contents of all of which are incorporated herein by reference in their entirety.

TECHNICAL FIELD

The present invention relates to a supercharged internal combustion engine, and more particularly relates to a supercharged internal combustion engine that can introduce EGR gas into an intake passage at an upstream side of a compressor that supercharges intake air.

BACKGROUND ART

Conventionally, an internal combustion engine with a turbocharger is disclosed in Patent Literature 1, for example. The internal combustion engine includes an intercooler that cools supercharged intake air, and an EGR cooler that cools EGR gas that is introduced into an intake passage at the upstream side of a compressor. An EGR gas amount is controlled so that condensed water is not generated in the intercooler and the EGR cooler.

CITATION LIST

Patent Literature

Patent Literature 1: Japanese Laid-open Patent Application Publication No, 2012-087779
Patent Literature 2: Japanese Patent No. 5144049

SUMMARY OF INVENTION

Technical Problem

At the initial stage of warming up after a cold engine start-up is performed, condensed water is easily generated if EGR gas is introduced. Therefore, at the initial stage of warming up, an EGR valve is usually closed. However, even when the EGR valve is being closed, exhaust gas stays in an EGR passage at the upstream side of the EGR valve in the EGR gas flow direction. Therefore, the moisture in the exhaust gas touches the EGR valve which is cold, whereby dew condensation may occur on the surface of the EGR valve at the side exposed to the exhaust gas, and condensed water may be generated. Further, even in a situation other than the time of warming up, if the EGR valve that is in a closed state is cooled by low-temperature intake air during operation, condensed water may adhere to the surface of the EGR valve.

If the EGR valve is opened and the EGR gas is introduced without any consideration being given to the generation of condensed water in the EGR valve, the condensed water flows into an intake passage. Meanwhile, there is known a supercharged internal combustion engine in which a compressor that supercharges intake air is disposed in an intake passage at the downstream side with respect to a portion where EGR gas is introduced in the intake passage, as with the internal combustion engine described in Patent Literature 1. If the condensed water which has flown into the intake passage is sucked into the compressor in the supercharged internal combustion engine like this, there is a concern that an erosion phenomenon may occur by droplets of the condensed water colliding with the impeller of the compressor. Further, if introduction of the EGR gas is prohibited until the condensed water on the EGR valve is eliminated by the internal combustion engine being completely warmed up, a fuel efficiency effect by introduction, of the EGR gas is no longer obtained.

The present invention is made to solve the problem as described above, and has an object to provide a supercharged internal combustion engine that, even when an EGR valve is in a cold state, can suppress adhesion of condensed water to its valve surface while the EGR valve is closed.

Solution to Problem

A first aspect of the present invention is a supercharged internal combustion engine, which includes a compressor, an EGR passage, an EGR valve, a seal portion and a heat insulator. The compressor supercharges intake air. The EGR passage connects an intake passage at an upstream side of the compressor and an exhaust passage. The EGR valve is provided in the EGR passage, and regulates a flow rate of EGR gas that flows through the EGR passage by opening and closing the EGR passage. The seal portion seals a space between the EGR valve and a wall surface of the EGR passage. The heat insulator is provided on a surface of the EGR valve that is exposed to the EGR passage which is located at an upstream side in an EGR gas flow with respect to the seal portion when the EGR valve is in a fully closed position. The heat insulator is not provided on a surface of the EGR valve that corresponds to the seal portion.

According to a second aspect of the present invention, in the supercharged internal combustion engine according to the first aspect of the present invention, the EGR valve is a poppet type EGR valve having a valve body that is umbrella-shaped and opens and closes the EGR passage, and a valve shaft one end of which is fixed to the valve body. The valve body includes a seal surface that is in contact with a valve seat which is provided on the wall surface of the EGR passage when the valve body is seated on the valve seat. The heat insulator is provided on a surface of the valve body that is exposed to the EGR passage which is located at the upstream side in the EGR as flow with respect to the seal surface.

According to a third aspect of the present invention, in the supercharged internal combustion engine according to the second aspect of the present invention, the valve body includes an umbrella surface that is a surface of the valve body at a side opposite from a site to which the valve shaft is fixed, and a side circumferential surface that is a surface of a site that is located between the umbrella surface and the seal surface. The heat insulator is formed so as to cover the umbrella surface, and so as to be in contact with the wall surface of the EGR passage which is located at an upstream side the valve seat in an EGR gas flow direction, throughout an entire circumference of the wall surface, when the valve body is in a fully closed position. A gap that is present between the side circumferential surface and the wall surface of the EGR passage facing the side circumferential surface when the valve body is in the fully closed position is separated, by the heat insulator, from an internal space of the EGR passage that is located at an upstream side of the gap in the EGR gas flow direction.

Advantageous Effects of Invention

According to the first aspect of the present invention, in the supercharged internal combustion engine including the seal portion that seals the space between the EGR valve and the wall surface of the EGR passage, the heat insulator that is provided on the surface of the EGR valve that is exposed to the EGR passage which is located at the upstream side in the EGR gas flow with respect to the seal portion when the EGR valve is in the fully closed position is included, whereby even when the EGR valve is cold, the EGR valve and the EGR gas which is a condensed water generation source are thermally insulated from each other by the heat insulator. Therefore, the EGR gas can be prevented from being cooled to a dew point of the EGR gas by direct contact with the EGR valve during valve closure. Like this, according to the present invention, adhesion of the condensed water to the surface of the EGR valve can be suppressed during valve closure by using the simple structure.

According to the second aspect of the present invention, in the case of using a poppet type EGR valve, adhesion of the condensed water to the surface of the EGR valve can be suppressed during valve closure by using the simple structure.

According to the third aspect of the present invention, at the time of valve closure of the EGR valve, an entry path of the EGR gas into the gap between the side circumferential surface and the wall surface of the EGR passage which faces the side circumferential surface can be separated by the heat insulator. Thereby, condensed water can be prevented from being present during the valve closure of the EGR valve, in the site where the condensed water is easily sucked to the intake passage side together with the EGR gas when the EGR valve is opened. Therefore, according to the present invention, condensed water can be more reliably prevented from being sucked to the intake passage side together with the EGR gas when the EGR valve is opened.

BRIEF DESCRIPTION OF DRAWINGS

FIG. 3 is a sectional view for explaining a configuration of a heat insulator according to embodiment 2 of the present invention;

FIG. 4(A) and FIG. 4(B) are views for explaining a configuration of a heat insulator according to embodiment 3 of the present invention;

FIG. 5(A) and FIG. 5(B) are views for explaining a configuration of a heat insulator according to embodiment 4 of the present invention; and FIG. 6 is a view for explaining a configuration of a heat insulator of embodiment 5 of the present invention.

DESCRIPTION OF EMBODIMENTS

Embodiment 1

[Configuration of Periphery of EGR Device of Internal Combustion Engine]

Figure 1:
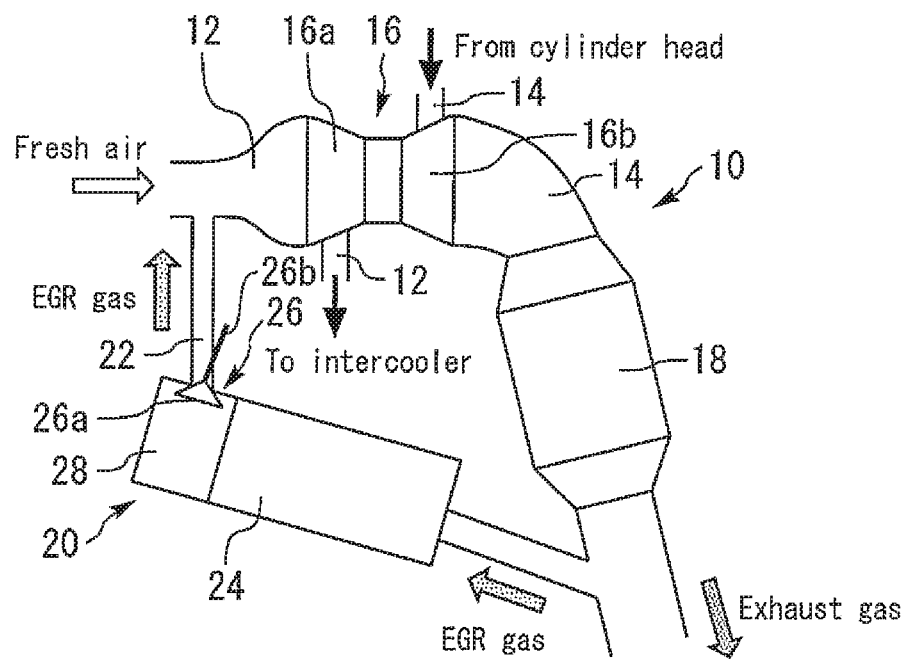
FIG. 1 is a view for explaining a configuration of a periphery of an EGR device in an internal combustion engine according to embodiment 1 of the present invention.

FIG. 1 is a view for explaining a configuration of a periphery of an EGR device 20 in an internal combustion engine 10 according to embodiment 1 of the present invention. The internal combustion engine 10 is an internal combustion engine with a supercharger (as one example, a turbocharger 16), and includes an intake passage 12 through which air that is taken into a cylinder flows, and an exhaust passage 14 through which exhaust gas that is exhausted from the inside of the cylinder flows. In the intake passage 12, a compressor 16a of the turbocharger 16 is disposed. Meanwhile, in the exhaust passage 14, a turbine 16b that is integrally connected to the compressor 16a via a connection shaft (not illustrated) is disposed.

In the exhaust passage 14 at the downstream side of the turbine 16b, an exhaust gas purifying catalyst (as one example, a three-way catalyst) 18 is disposed. Further, the internal combustion engine 10 shown in FIG. 1 includes the low pressure loop (LPL) type EGR device 20. The EGR device 20 includes an EGR passage 22 that connects the exhaust passage 14 at the downstream side of the exhaust gas purifying catalyst 18 and the intake passage 12 at the upstream side of the compressor 16a. In the EGR passage 22, an EGR cooler 24 for cooling EGR gas that flows through the inside thereof is disposed. Note that the EGR passage to be a target of the present invention is not limited to the above described configuration with respect to a connection position of the EGR passage to the exhaust passage if only the EGR passage can introduce EGR gas to the intake passage 12 at the upstream side of the compressor 16a.

An EGR valve 26 is provided in the EGR passage 22 at the downstream side of the EGR cooler 24 in the EGR gas flow direction. The EGR valve 26 regulates the flow rate of the EGR gas which is recirculated to the intake passage 12 by opening and closing the EGR passage 22. The EGR valve 26 is driven to open and close based on a command from an ECU (Electronic Control Unit) not illustrated. More specifically, an EGR valve housing 28 that accommodates the EGR valve 26 is disposed in the EGR passage 22 at the downstream side of the EGR cooler 24 in the EGR gas flow direction.

Inside the EGR valve housing 28, an internal passage 22a (see FIG. 2) that functions as a part of the EGR passage 22 is formed. The EGR valve 26 is made of a metal, and is a poppet type EGR valve having an umbrella-shaped valve body 26a that opens and closes (the internal passage 22a of) the EGR passage 22, and a valve shaft 26b one end of which is fixed to the valve body 26a. When the EGR valve 26 is closed, the EGR passage 22 at the downstream side of the EGR valve 26 is filled with fresh air. Accordingly, in a case of the present configuration, sites (a part of each of the valve body 26a and the valve shaft 26b) of the EGR valve 26 which are exposed to the EGR passage 22 at the downstream side of the EGR valve 26 correspond to sites that are exposed to intake air at the time of valve closing. Note that the EGR valve housing 28 is warmed by cooling water of the internal combustion engine 10.

At the initial stage of warming up after a cold engine start-up is performed, condensed water is easily generated if EGR gas is introduced. Therefore, at the initial stage of warming up, the EGR valve is usually closed. However, even when the EGR valve is being closed, exhaust gas stays in the EGR passage at the upstream side of the EGR valve in the EGR gas flow direction. Therefore, moisture in the exhaust gas contacts the cold EGR valve, whereby dew condensation may occur on the surface of the EGR valve at a side exposed to the exhaust gas, and condensed water may be generated. This similarly applies to an internal combustion engine that has a configuration in which an EGR valve housing is warmed by cooling water as in the configuration of the present embodiment, because a cooling water temperature is low at the initial stage of warming up. Further, in the configuration in which a part of an EGR valve is exposed to intake air during valve closure as in the present configuration, if the EGR valve during valve closure is cooled to a dew point or a lower temperature of the EGR gas (more specifically, the exhaust gas which stays in the EGR passage at the upstream side of the EGR valve) by low temperature intake air, condensed water is generated on the surface of the EGR valve even after the warming up is completed. Note that this becomes conspicuous in a case where an EGR valve is configured to be more easily exposed to intake air by the EGR valve being disposed at an end portion of an EGR passage at the intake passage side, unlike the present configuration.

[Characteristic Configuration of EGR Valve]

Figure 2:
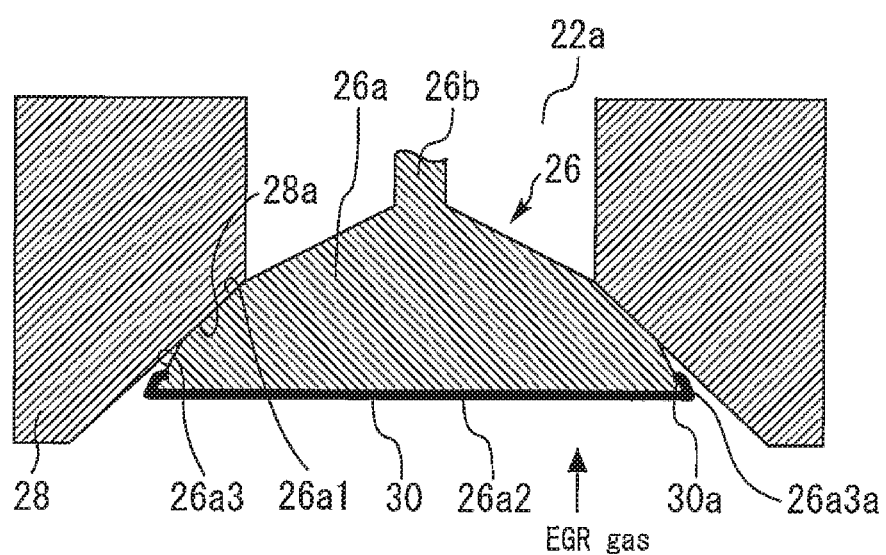
FIG. 2 is a sectional view for explaining a characteristic configuration of the EGR valve shown in FIG. 1.

FIG. 2 is a sectional view for explaining a characteristic configuration of the EGR valve 26 shown in FIG. 1. A valve seat 28a on which the valve body 26a is seated is provided on a wall surface of the internal passage 22a of the EGR passage 22 (more specifically, on a wall surface of the EGR valve housing 28). The valve body (the umbrella portion) 26a of the EGR valve 26 includes a seal surface 26a1 in an annular shape that contacts the valve seat 28a when the valve body 26a is seated on the valve seat 28a. The EGR valve 26 shuts off the EGR passage 22 when the valve body 26a is seated and the seal surface 26a1 contacts the valve seat 28a (that is to say, when the EGR valve 26 is in a fully closed position).

A heat insulator 30 is provided for the EGR valve 26 of the present embodiment. The heat insulator 30 is provided on a "surface" of the EGR valve 26 that is exposed to the EGR passage 22 that is located at the upstream side of the EGR gas flow with respect to a "seal portion" that seals a space between the EGR valve 26 and the wall surface of the EGR passage 22 when the EGR valve 26 is in the fully closed position. More specifically, in a case of the poppet type EGR valve 26, a site where the seal surface 26a1 and the valve seat 28a are in contact with each other at the time of valve closure corresponds to the "seal portion" mentioned here. Further, a surface of the valve body 26a that is located at the upstream side of the seal surface 26a1 in the EGR gas flow direction, that is, an umbrella surface 26a2 and aside circumferential surface 26a3 of the valve body 26a correspond to the "surface" of the EGR valve 26 mentioned here. The umbrella surface 26a2 is a surface of the valve body 26a at a side opposite from a site to which the valve shaft 26b is fixed, and the side circumferential surface 26a3 is a surface of a site which is located between the seal surface 26a1 and the umbrella surface 26a2. To add to that, the heat insulator 30 is not provided for the wall surface of the EGR valve 26 corresponding to the seal portion (namely, the seal surface 26a1). In other words, when the EGR valve 26 is in the fully closed position, the seal surface 26a1 is directly in contact with the valve seat 28a.

The heat insulator 30 is in a substantially disk shape and is formed as a cover that covers a whole of the umbrella surface 26a2. As a material of the heat insulator 30, a material (as one example, a resin) with a thermal conductivity lower than the thermal conductivity of the metal EGR valve 26 is used. As a method for attaching the heat insulator 30 to the EGR valve 26, an insertion method is used as an example here. More specifically, a claw 30a that is provided at the heat insulator 30 is engaged with a step 26a3a that is formed on the side circumferential surface 26a3 of the valve body 26a, whereby the heat insulator 30 is fixed to the EGR valve 26. Note that the heat insulator 30 more easily ensures heat insulation performance by sufficiently ensuring the thickness of the heat insulator 30 when the heat insulator 30 is formed as the cover as described above, but the heat insulator of the present invention may be formed by coating the corresponding portion of the EGR valve with a heat insulating material such as a resin.

As described above, the EGR valve 26 of the present embodiment is provided with the heat insulator 30 in such a manner as to cover the surface (mainly, the umbrella surface 26a2) of the valve body 26a which is exposed to the EGR passage 22 which is located at the upstream side of the seal surface 26a1 in the EGR gas flow direction. Thereby, even when the EGR valve 26 is as cold as or colder than a dew point of the EGR gas which stays in the EGR passage 22, the EGR valve 26 and the EGR gas which is a condensed water generation source are thermally insulated from each other by the heat insulator 30 with a thermal conductivity lower than the thermal conductivity of the EGR valve 26. Therefore, the EGR gas can be prevented from being cooled to the dew point thereof by direct contact with the EGR valve 26 during valve closure. As above, according to the configuration of the present embodiment, condensed water can be prevented from adhering to the surface of the EGR valve 26 during the valve closure by using the simple structure.

Incidentally, in embodiment 1 described above, the example in which the heat insulator 30 is formed in the mode in which the site of the side circumferential surface 26a3 which is not covered with the heat insulator 30 is present. However, instead of the configuration like this, a heat insulator that covers the entire side circumferential surface 26a3 as well as the umbrella surface 26a2 may be used.

Embodiment 2

Next, with reference to FIG. 3, embodiment 2 of the present invention will be described.

FIG. 3 is a sectional view for explaining a configuration of a heat insulator 32 according to embodiment 2 of the present invention. Note that in FIG. 3, the same elements as the constituent elements shown in FIG. 2 described above are assigned with the same reference signs, and explanation, thereof will be omitted or abbreviated.

In the configuration of embodiment described above, a part (corresponding to a metal site 26a3b in FIG. 3) of the side circumferential surface 26a3 of the valve body 26a is not covered with the heat insulator 30 as shown in FIG. 2, and is exposed to EGR gas in the EGR passage 22 at the upstream side of the seal surface 26a1. Even with the configuration as above, the entire umbrella surface 26a2 which occupies most of the surface of the valve body 26a which is located at the upstream side of the seal surface 26a1 in the EGR gas flow direction is covered with the heat insulator 30, and therefore, it can be said that adhesion of the condensed water to the surface of the valve body 26a is sufficiently restrained. However, according to the configuration, there remains a possibility of the condensed water adhering to the site 26a3b which is not covered with the heat insulator 30, in the side circumferential surface 26a3. The site 26a3b is a site where condensed water is easily sucked to the intake passage 12 side together with the EGR gas when the EGR valve 26 is opened.

Therefore, as shown in FIG. 3, in the present embodiment, the heat insulator 32 is formed so as to be in contact with a wall surface (that is, the wall surface 28b of the EGR valve housing 28) of the EGR passage 22 which is located at the upstream side of the valve seat 28a in the EGR gas flow direction, throughout an entire circumference of the wall surface 28b, when the valve body 26a is in the fully closed position. By the heat insulator 32 which is formed as above, a gap which is present between the side circumferential surface 26a3 and the wall surface 28b of the EGR valve housing 28 which faces the side circumferential surface 26a3 when the valve body 26a is in the fully closed position is separated from an internal space of the EGR passage 22 that is located at the upstream side of the gap in the EGR gas flow direction.

According to the heat insulator 32 which is configured as described above, an entry path of the EGR gas to the site 26a3b of the side circumferential surface 26a3 which is not covered with the heat insulator 32 can be shut off by the heat insulator 32, at the time of closure of the EGR valve 26. Thereby, during closure of the EGR valve 26, condensed water can be prevented from existing in the site 26a3b where the condensed water is easily sucked to the intake passage 12 side together with the EGR gas when the EGR valve 26 is opened. Therefore, according to the present configuration, the condensed water can be more reliably prevented from being sucked to the intake passage 12 side together with the EGR gas when the EGR valve 26 is opened.

Incidentally, in embodiment 2 described above, the example is described, in which the heat insulator 32 is formed in a mode in which the site 26a3b of the side circumferential surface 26a3 which is not covered with the heat insulator 32 is present. However, in the present invention, as "the heat insulator which is formed so as to cover the umbrella surface, and so as to be in contact with the wall surface of the EGR passage which is located at the upstream side of the valve seat in the EGR gas flow direction, throughout the entire circumference of the wall surface, when the valve body is in the fully closed position", a heat insulator that is formed in a mode in which the side circumferential surface is not covered with the heat insulator at all may be adopted, if only the heat insulator can cause the gap which is present between the side circumferential surface and the wall surface of the EGR passage which faces the side circumferential surface when the valve body is in the fully closed position to be separated, by the heat insulator, from the internal space of the EGR passage which is located at the upstream side of the gap in the EGR gas flow direction.

Further, an effect of restraining adhesion of the condensed water to the surface of the EGR valve by the heat insulator of the present invention is reduced more as the site of the EGR valve which is exposed to the EGR passage at the upstream side of the seal portion during valve closure increases more. Accordingly, as the surface of the EGR valve which is a target to be covered with the heat insulator of the present invention when it is applied to the poppet type EGR valve, as with the heat insulators 30 and 32 of embodiments 1 and 2 described above, such a surface is preferable, that includes at least the whole of the umbrella surface 26a2 which occupies most of the surface of the valve body 26a which is located at the upstream side of the seal surface 26a1 in the EGR gas flow direction. However, the heat insulator which is applied to the poppet type EGR valve is not always limited to the heat insulator in the mode which covers the whole of the umbrella surface, and may be an insulator in a mode which substantially covers the whole of the umbrella surface although a very small site at the circumferential edge of the umbrella surface is exposed to the EGR passage, for example.

Embodiment 3

Next, embodiment 3 of the present invention will be described with reference to FIG. 4(A) and FIG. 4(B).

FIG. 4(A) and FIG. 4(B) are views for explaining a configuration of a heat insulator 44 according to embodiment 3 of the present invention. An EGR valve 40 shown in FIG. 4(A) and FIG. 4(B) is of a butterfly type. The heat insulator of the present invention is also applicable to the EGR valve 40 of the type like this. Note that an internal combustion engine of the present embodiment is configured similarly to the aforementioned internal combustion engine 10 except for a point that will be described as follows.

The EGR valve 40 shown in FIG. 4(A) and FIG. 4(B) is disposed at a site halfway through an EGR passage 42. The EGR valve 40 includes a disk-shaped valve body 40a that opens and closes the EGR passage 42, and a valve shaft 40b that is provided in a center of the valve body 40a to function as a rotational shaft of the valve body 40a.

FIG. 4(A) and FIG. 4(B) show the EGR valve 40 at a time of being in the fully closed position. As shown in FIG. 4(A) and FIG. 4(B), in the EGR valve 40 of the present configuration, the valve body 40a and a wall surface of the EGR passage 42 are not in contact with each other at a time of valve closure, and a very small gap for allowing opening and closing of the valve body 40a is formed between the valve body 40a and the wall surface. That is to say, in the present configuration, a site between a circumferential surface 40a1 of the valve body 40a and the wall surface of the EGR passage 42 which faces the circumferential surface 40a1 corresponds to a "seal portion" in a non-contact manner in the present invention.

On top of the above, a disk-shaped heat insulator 44 is included so as to cover surfaces of the valve body 40a and the valve shaft 40b at the upstream side of the EGR gas flow with respect to the above described seal portion. Here, the heat insulator 44 is an insertion type cover, as one example, and a plurality of projections 44a that are respectively engaged with a plurality of holes 40a2 that are formed in the valve body 40a are formed in the heat insulator 44. To add to that, the heat insulator 44 is not provided at the wall surface of the EGR valve corresponding to the seal portion (that is, the circumferential surface 40a1 of the valve body 40a). In other words, when the EGR valve 40 is in the fully closed position, the circumferential surface 40a1 of the valve body 40a faces the wall surface of the EGR passage 42 via a clearance.

According to the configuration of the present embodiment described above, condensed water also can be prevented from adhering to the surface of the EGR valve 40 during valve closure by using the simple structure.

Embodiment 4

Next, embodiment 4 of the present invention will be described with reference to FIG. 5(A) and FIG. 5(B).

FIG. 5(A) and FIG. 5(B) are views for explaining a configuration of a heat insulator 48 according to embodiment 4 of the present invention. In embodiment 3 described above, explanation is made by citing the configuration in which the "seal portion" is of a non-contact type by using the butterfly type EGR valve 40, as an example. However, the heat insulator of the present invention also can be applied to a configuration in which a "seal portion" is of a contact type by using the butterfly type EGR valve 40, as shown as follows.

The wall surface of an EGR passage 46 of the configuration shown in FIG. 5(A) and FIG. 5(B) includes a valve seat 46a in which a circumferential edge portion 40a3 of the flat surface portion of the valve body 40a at the time of valve closure. The valve seat 46a is formed in a position where the valve seat 46a can contact the circumferential edge portion 40a3 of the valve body 40a at the time of valve closure in a mode that does not inhibit opening and closing of the valve body 40*a*. That is to say, in the present configuration, the circumferential edge portion 40*a*3 corresponds to the "seal surface" of the valve body 40*a*. A site where the seal surface (the circumferential edge portion) 40*a*3 and the valve seat 46*a* are in contact with each other at the time of valve closure corresponds to the "seal portion".

On top of that, the heat insulator 48 is formed on surfaces of the valve body 40*a* that is located at the upstream side of the seal surface (the circumferential edge portion) 40*a*3 in the EGR gas flow direction, that is, surfaces of the valve body 40*a* and the valve shaft 40*b* that are exposed to the EGR passage 46 at the upstream side of the EGR gas flow. To add to that, the heat insulator 48 is not provided for the wall surface (that is, the seal surface (the circumferential edge portion) 40*a*3) of the EGR valve 40 corresponding to the seal portion. In other words, when the EGR valve 40 is in the fully closed position, the seal surface 40*a*3 is directly in contact with the valve seat 46*a*. As an attaching method of the heat insulator 48 to the EGR valve 40, the method described above for the heat insulator 44 can be used.

According to the configuration of the present embodiment described above, condensed water can be prevented from adhering to the surface of the EGR valve 40 during valve closure by using the simple structure.

Embodiment 5

Next, embodiment 5 of the present invention will be described with reference to FIG. 6.

FIG. 6 is a view for explaining a configuration of a heat insulator 54 of embodiment 5 of the present invention. An EGR valve 50 shown in FIG. 6 is of a flap type. The heat insulator of the present invention is also applicable to the EGR valve 50 of the type like this. Note that an internal combustion engine of the present embodiment is constructed similarly to the aforementioned internal combustion engine 10, except for a point that will be described as follows.

The EGR valve 50 shown in FIG. 6 is disposed at an end portion 52*a* of an EGR passage 52 at the intake passage 12 side. The EGR valve 50 includes a plate-shaped valve body 50*a* that opens and closes the end portion (an opening of the EGR passage 52) 52*a*, and a valve shaft 50*b* that is fixed to one end portion of the valve body 50*a* to function as a rotational shaft of the valve body 50*a*.

As shown in FIG. 6, when the EGR valve 50 is closed, the valve body 50*a* is seated on the wall surface of the end portion 52*a* of the EGR passage 52. That is to say, in the present configuration, a site of the valve body 50*a* which is in contact with a site (valve seat) 52*a*1 that forms a circumferential edge of an opening of the end portion 52*a* of the EGR passage 52 corresponds to a seal surface 50*a*1. A site 50*a*2 inside the seal surface 50*a*1 corresponds to "a surface of the EGR valve 50 that is exposed to the EGR passage 52 which is located at the upstream side in the EGR gas flow with respect to the seal portion which seals a space between the EGR valve 50 and the wall surface (the above described site 52*a*1) of the EGR passage 52 when the EGR valve 50 is in the fully closed position".

Therefore, in the EGR valve 50, the disk-shaped heat insulator 54 is provided for the site 50*a*2 of the valve body 50*a*. To add to that, the heat insulator 54 is not provided for the wall surface of the EGR valve 50 that corresponds to the seal portion (that is, the seal surface 50*a*1). In other words, when the EGR valve 50 is in the fully closed position, the seal surface 50*a*1 is directly in contact with the valve seat 52*a*1. As the method for attaching the heat insulator 54 to the valve body 50*a*, a similar method to the method in embodiment 3 can be used, for example.

According to the configuration of the present embodiment described above, condensed water can be prevented from adhering to the surface of the EGR valve 50 during valve closure by using the simple structure.

REFERENCE SIGNS LIST

10 internal combustion engine
12 intake passage
14 exhaust passage
16 turbocharger
16*a* compressor
16*b* turbine
18 exhaust gas purifying catalyst
20 EGR device
22, 42, 46, 52 EGR passage
22*a* internal passage of EGR passage
24 EGR cooler
26 poppet type EGR, valve
26*a* valve body of poppet type EGR valve
26*a*1 seal surface
26*a*2 umbrella surface of valve body
26*a*3 side circumferential surface
26*a*3*a* step of side circumferential surface
26*a*3*b* site of side circumferential surface
26*b* valve shaft of poppet type EGR valve
28 EGR valve housing
28*a* valve seat of EGR valve housing
28*b* wall surface of EGR valve housing
30, 32, 44, 48, 54 heat insulator
30*a* claw of heat insulator
40 butterfly type EGR valve
40*a* valve body of butterfly type EGR valve
40*a*1 circumferential surface of valve body
40*a*2 hole of valve body
40*a*3 circumferential edge portion of valve body
40*b* valve shaft of butterfly type EGR valve
44*a* projection of heat insulator
46*a* valve seat of EGR passage
50 flap type EGR valve
50*a* valve body of flap type EGR valve
50*a*1 seal surface of valve body
50*a*2 site of valve body
50*b* valve shaft of flap type EGR valve
52*a* end portion of EGR passage
52*a*1 site of end portion of EGR passage

The invention claimed is:

1. An internal combustion engine, comprising:
a supercharger including a compressor supercharging intake air into the internal combustion engine;
an EGR passage connecting an exhaust passage to an intake passage at an upstream side of the compressor;
an EGR valve provided in the EGR passage, and controlled by a controller to regulate a flow rate of an EGR flow that passes through the EGR passage;
wherein the EGR valve is a poppet type EGR valve having a valve body that is umbrella shaped and a valve shaft, one end of which is fixed to the valve body; and
wherein the valve body further includes:
a seal surface positioned on the wall surface of the EGR passage and being in contact with a valve seat as the valve body is seated on the valve seat; and
an umbrella surface being a surface of the valve body at a side opposite from a side to which the valve shaft is fixed, and a side circumferential surface positioned between the umbrella surface and the seal surface;

a heat insulator provided on a surface of the EGR valve and exposed to the EGR passage which is located at an upstream side in an EGR gas flow with respect to the seal surface when the EGR valve is in a fully closed position;

wherein the heat insulator is not provided on a surface of the EGR valve that corresponds to the seal surface, wherein, when the valve body is in a fully closed position, the heat insulator covers the umbrella surface, and is in contact with the wall surface of the EGR passage at an upstream side of the valve seat in an EGR gas flow direction, throughout an entire circumference of the wall surface; and wherein, when the valve body is in the fully closed position, a gap is present between the side circumferential surface and the wall surface of the EGR passage facing the side circumferential surface and the gap is separated, by the heat insulator, from an internal space of the EGR passage that is located at an upstream side of the gap in the EGR gas flow direction.

\* \* \* \* \*